US006488805B1

(12) United States Patent
Sauer

(10) Patent No.: US 6,488,805 B1
(45) Date of Patent: Dec. 3, 2002

(54) METAL SURFACE TREATMENT

(75) Inventor: Jochem Sauer, Rheinfelden (CH)

(73) Assignee: Vantico, Inc., Brewster, NY (US)

( * ) Notice: Subject to any disclaimer, the term of this patent is extended or adjusted under 35 U.S.C. 154(b) by 0 days.

(21) Appl. No.: 09/230,172

(22) PCT Filed: Jul. 14, 1997

(86) PCT No.: PCT/EP97/03759

§ 371 (c)(1),
(2), (4) Date: May 17, 1999

(87) PCT Pub. No.: WO98/03600

PCT Pub. Date: Jan. 29, 1998

(30) Foreign Application Priority Data

Jul. 23, 1996 (GB) ............................................ 9615469
Aug. 27, 1996 (GB) ............................................ 9617802

(51) Int. Cl.$^7$ ............................................. B32B 31/12
(52) U.S. Cl. ............................... 156/272.8; 156/273.3; 156/329; 427/515; 427/554; 427/327
(58) Field of Search ...................... 156/272.2, 272.8, 156/273.3, 275.7, 281, 329; 427/508, 515, 554, 327; 522/99, 79, 80, 84, 170, 172; 252/182.3; 106/287.13, 287.14, 287.15, 287.16

(56) References Cited

U.S. PATENT DOCUMENTS

| | | | | |
|---|---|---|---|---|
| 3,772,122 A | * | 11/1973 | Young | 156/329 |
| 4,491,508 A | * | 1/1985 | Olson et al. | 522/99 |
| 4,861,407 A | * | 8/1989 | Volkmann et al. | 156/272.8 |
| 5,312,520 A | | 5/1994 | Chung | |
| 5,451,345 A | * | 9/1995 | Hatton et al. | 427/515 |
| 5,891,530 A | * | 4/1999 | Wright | 427/515 |

FOREIGN PATENT DOCUMENTS

| | | |
|---|---|---|
| DE | 4312926 | 5/1994 |
| EP | 0353583 | 2/1990 |
| EP | 0592139 | 4/1994 |
| EP | 0619351 | 10/1994 |
| WO | 95/21277 | 8/1995 |
| WO | 96/23037 | 8/1996 |

OTHER PUBLICATIONS

Derwent Abstr. 93–299064 for JP 05212348.

* cited by examiner

*Primary Examiner*—Michael W. Ball
*Assistant Examiner*—John T. Haran
(74) *Attorney, Agent, or Firm*—Proskauer Rose LLP; K. H. Neuman, Esq.

(57) ABSTRACT

The invention provides a process for treating a metallic surface, other than a clean aluminum or aluminum alloy surface, which comprises treating the surface with an organosilane and exposing the surface to a laser.

22 Claims, No Drawings

METAL SURFACE TREATMENT

The present invention relates to a process for treating a metal surface, particularly in order to improve its adhesion properties.

Our published patent application No. WO96123037 describes a process for treating a metal surface which is aluminium or an aluminium alloy in order to improve its adhesion properties which comprises treating the clean metal surface with an organosilane and exposing the surface to a laser.

We have now surprisingly found that the organosilane and laser treatment is also suitable in pretreatment of other metal surfaces prior to bonding or other processing where adhesion properties of the surfaces are important and also in the pretreatment of an aluminium or aluminium alloy surface which is not clean.

Accordingly the present invention provides a process for treating a metallic surface, other than a clean aluminium or aluminium alloy surface, which comprises treating the surface with an organosilane and exposing the surface to a laser.

The metallic surface may be of any metal. Examples of suitable metals include steel, e.g. stainless steel, iron in ferrite form, titanium, magnesium, copper, gold, nickel or chromium or an alloy of said metal. The metallic surface may also be a non-clean aluminium or aluminium alloy surface.

The metallic surface may be treated with the organosilane and the laser in either order. Preferably, however, an organosilane is first applied to the metallic surface and the coated surface is exposed to a laser.

It is also possible to expose the surface to a laser, apply an organosilane, and then expose the surface again to a laser.

The metallic surface may be clean; for example, it may be degreased, generally using any standard method such as wiping with a solvent such as acetone, vapour degreasing, dipping with or without ultrasonic treatment or by using alkaline degreasing agents. The process of the invention can also be used to treat the metallic surface when it is not clean, for example when it is oily or when it is aged.

The organosilane may be a compound of formula I $$R_nSi(OR^1)_m \quad (I)$$

where R is an organic group which may be reactive or non reactive, $R^1$ is alkyl, alkoxyalkyl or acyl, n is 1 or 2 and m is 2 or 3 such that n+m=4. Preferably n is 1 and m is 3.

Examples of organic groups R include alkyl, phenyl, vinyl, acrylatoalkyl, glycidyloxyalkyl and the like, where "alkyl" groups have 1 to 4 carbon atoms.

When $R^1$ is alkyl, it is preferably lower alkyl with 1 to 4 carbon atoms and most preferably methyl or ethyl. When $R^1$ is alkoxyalkyl, each alkyl moiety preferably has 1 to 4 carbon atoms. Most preferably as alkoxyalkyl $R^1$ is methoxyethyl. When $R^1$ is acyl it preferably has 2 to 4 carbon atoms, most preferably acetyl.

Specific examples of suitable silanes are:

$CH_2=C(CH_3)COO(CH_2)_3Si(OCH_3)_3$

$CH_3Si(OCH_3)_3$
$C_6H_5Si(OCH_3)_3$
$CH_3(CH_2)_2Si(OCH_3)_3$
$HS(CH_2)_3Si(OCH_3)_3$
$CH_2=CHSi(OOCCH_3)_3$
$CH_2=CHSi(OCH_2CH_3)_3$
$CH_2=CHSi(OCH_3)_3$
$Cl6(CH_2)_3Si(OCH_3)_3$ and
$CH_2=CHSi(OCH_2CH_2OCH_3)_3$ The silane may be used in solution in water or an organic solvent.

If water is used as the solvent and the silane is difficult to dissolve, a small amount of a nonionic wetting agent may be added to the water before the silane addition. Alternatively, the silane may be used as an emulsion.

Suitable organic solvents include alcohols, esters, ethers, ketones and chlorinated hydrocarbons. Preferred alcohols are alkanols with 1 to 10 carbon atoms such as methanol, ethanol, propanol, hexanol and decanol. Preferred esters are $C_1$–$C_4$ alkyl esters of $C_1$–$C_4$ aliphatic carboxylic acids such as methyl acetate, ethyl acetate, butyl acetate and methyl propionate. Preferred ethers are dialkyl ethers such as diethyl ether, butoxyethanol and cyclic ethers such as tetrahydrofuran. Preferred chlorinated hydrocarbons are dichloromethane, 1,2-dichloroethane, and trichloromethane. Preferred ketones are lower aliphatic ketones such as acetone and methyl ethyl ketone. Mixtures of these solvents may be used if desired. The most preferred solvents are polar solvents such as ketones, especially acetone. Water and/or a carboxylic acid may also be added to suitable organic solvents as part of the solution.

The solution may contain any concentration of silane preferably from 1 to 10% by weight of the silane based on the total weight of the solution.

The organosilane solution may be applied by any suitable method, for example, wiping, brushing or spraying on to the areas to be treated.

Degreasing, when desired, of the metal surface, the application of organosilane solution and the laser treatment may all be carried out with automatic equipment such as robots.

Any suitable laser may be used, e.g. at 400 nJ/pulse. Suitable lasers include, for example excimer lasers and Q-switched Nd:YAG lasers. Others are well known in the literature.

For high treatment speeds and not to damage the metal surface through unacceptable high energy concentrations, good results can be obtained using an unfocussed laser.

The actual power level needed to avoid damaging the metal surface depends on the actual surface being treated and on the specific laser used. This can be readily determined by simple experiment.

After treatment of the metallic surface by the process of the invention, the surface is ready for bonding or other processing where the adhesion properties of the surface are important, for example coating or encapsulating. The bonding may be to another surface by means of an adhesive or, e.g. by applying a coating to the surface. When bonding to another surface, that other surface may be metallic or non metallic. If it is metallic, it too may be pretreated by the same process as described above if desired.

When the treated surface is bonded to another surface, this may be achieved using any adhesive such as 1-component or 2-component epoxy or polyurethane adhesives. Preferably the adhesive used is one which will react with the organosilane used in the process of the invention.

The process of the invention provides excellent joint performance, a fast treatment, a clean process, ecological advantages over conventional "wet" processes and sandblasting processes, allows for the use of a wide range of adhesives and makes local treatment of the areas to be bonded possible. A marked improvement in adhesion properties of metal surfaces can be obtained by the process of the invention.

The invention is illustrated by the following Examples.

EXAMPLE 1

In this Example the metals used are an aluminium alloy (L165), stainless steel, a magnesium alloy (>90% Mg, <8% Al, <2% Zn), and titanium (ASTM Grade 2).

These metals are tested using different surface conditions:
a) Uncleaned i.e. "as received"—this is the metal as delivered from the supplier with no alteration of the surface at all.
b) Clean i.e. "degreased"—the metal "as received" has undergone degreasing by means of a trichloroethylene vapour degreasing bath.
c) Aged—the metal "as received" is artificially aged in a humidity cabinet for 7 days at 40° C./100% relative humidity.

Coupons, suitable for lap shear specimens, mounted on the baseplate of a holding jig, are "primed" by the primer solution in a ~25mm stripe across one end of each row in the area to be bonded. The primer is allowed to air-dry for 5 minutes at room temperature before being mounted on the X-Y stage of the laser.

The primer is a solution containing 81.5 parts by weight ethanol, 2.8 parts by weight glacial acetic acid, 9.4 parts by weight deionised water and 6.3 parts by weight gamma—glycidoxypropyltrimethoxy silane.

The laser used in this Example is an Excimer laser operating at a pulse frequency of 30 Hz. Three energy density levels (low, medium and high) are used for each set of samples to give a spread of exposures. The energy density is modified by either inserting an attenuator and glass filters in the beam or, by altering the spot area and keeping the beam energy constant.

A jig is used to produce lap shear joints with consistent overlaps of 12.5 mm×25 mm for all the metals except the magnesium alloy. Initial experiments with the magnesium alloy indicated that for the thickness of the coupon a bond area of 3 12.5 mM$^2$ is too large and caused the substrate to fail before the adhesive. Therefore, for the magnesium alone, the overlap is reduced to 5 mm×25 mm.

The adhesive is a one component epoxy paste adhesive which is a butadiene-acrylonitrile rubber modified bisphenol-A epoxy resin using dicyandiamide and chlortoluron as curing agents.

All joints are given a cure of 30 minutes at 150° C.

Control experiments without primer and laser pretreatment are also carried out to demonstrate the effect of the pretreatment.

The lap shear strength of the prepared joints is determined according to ISO 4587 with the exception that the test speed is set at 10 mm min$^{-1}$. The lap shear strength is recorded and the failure mode also is recorded with reference to the descriptions given in ISO 10365.

The durability of the joints and the effect of the pretreatment are also tested by carrying out accelerated ageing tests prior to determining the lap shear strength. Two accelerated ageing techniques are employed.
a) 14 days Kataplasma Test which involves heating at about 70° C. under conditions of high humidity for 14 days followed by cooling to −20° C. and storing for 2 hours after which the samples are allowed to rise to ambient temperature before being tested.
b) 1000 hours salt spray (350 hours only for magnesium) according to Mechanical Testing Section ageing procedure AP8—which is taken from ASTM B117-94

In the tables presented below all the values quoted are in units of MPa for the lap shear strengths. The abbreviations used describe the predominate type of failure observed for each set of specimens.

AF=Adhesion Failure
SF=Substrate Failure
CF=Cohesion Failure

Control Experiments Results

These results are obtained on substrates without any use of pre-treatment other than degreasing in the case of the "CLEAN" set.

TABLE 1

Results obtained on metals with no primer or laser pre-treatment

| | CLEAN | | | UNCLEAN | | | AGED | | |
|---|---|---|---|---|---|---|---|---|---|
| | Initial | Kataplas. | Salt Spray | Initial | Kataplas. | Salt Spray | Initial | Kataplas. | Salt spray |
| Aluminium L165 | | | | 31.58 AF | 11.99 AF | 0.10 AF | 7.88 AF | 3.44 AF | 2.75 AF |
| Stainless steel | 23.98 AF | 18.77 AF | 22.37 AF | 23.50 AF | 16.20 AF | 21.23 AF | 23.18 AF | 16.62 AF | 22.26 AF |
| Magnesium alloy | 24.84 AF | | 0.11 AF | 21.54 AF | | 0.14 AF | 4.47 AF | | 2.63 AF |
| Titanium | 29.12 AF | 11.51 AF | 20.80 AF | 27.66 AF | 12.94 AF | 19.03 AF | 28.27 AF | 17.51 AF | 24.32 AF |

Primed/Eser Experiments Results

Again, the results presented are in units of MPa and the predominant failure modes are quoted except for the salt spray results for the magnesium alloy where substrate failure occurred in some cases. The designations LOW, MEDIUM, HIGH refer to the appropriate beam energy values used.

TABLE 2

Results from the CLEAN (degreased/primed/laser) lap shear joints

| | Initial | | | 14d Kata | | | Salt Spray | | |
|---|---|---|---|---|---|---|---|---|---|
| | LOW | MED | HIGH | LOW | MED | HIGH | LOW | MED | HIGH |
| Stainless steel | 29.81 CF | 29.92 CF | 29.86 CF | 26.92 CF | 27.32 CF | 27.01 CF | 25.76 CF | 25.53 CF | 27.30 CF |
| Magnesium alloy | 24.06 CF | 24.79 CF | 26.51 CF | | | | 10.05 1SF,2AF | 10.25 1SF,2AF | 8.65 2SF,1AF |
| Titanium | 34.81 CF | 35.83 CF | 35.44 CF | 27.96 AF | 23.83 AF | 31.61 CF | 25.60 AF | 31.27 AF | 33.06 CF |

TABLE 3

Results from the UNCLEANED (as received/primed/laser) lap shear joints

| | Initial | | | 14d Kata | | | Salt Spray | | |
|---|---|---|---|---|---|---|---|---|---|
| | LOW | MED | HIGH | LOW | MED | HIGH | LOW | MED | HIGH |
| Aluminium L165 | 43.92 CF | 36.05 CF | 37.39 CF | 39.72 CF | 39.33 CF | 35.38 CF | 37.13 CF | 38.99 CF | 33.10 CF |
| Stainless steel | 29.93 CF | 30.20 CF | 30.16 CF | 27.34 CF | 28.68 CF | 28.29 CF | 25.65 CF | 27.88 CF | 26.51 CF |
| Magnesium alloy | 26.32 CF | 26.98 CF | 23.97 CF | | | | 9.07 AF | 11.46 AF | 10.48 AF |
| Titanium | 35.07 CF | 35.22 CF | 35.82 CF | 24.09 AF | 30.61 CF | 32.05 CF | 27.80 AF | 30.12 AF | 33.44 CF |

TABLE 4

Results from the AGED (7d at 40° C./100% RH/primed/laser) lap shear joints

| | Initial | | | 14d Kata | | | Salt Spray | | |
|---|---|---|---|---|---|---|---|---|---|
| | LOW | MED | HIGH | LOW | MED | HIGH | LOW | MED | HIGH |
| Aluminium L165 | 23.80 AF | 23.09 CF | 19.44 AF | 25.15 CF | 26.33 CF | 24.69 CF | 24.25 AF | 22.84 AF | 17.70 AF |
| Stainless steel | 29.73 CF | 29.92 CF | 29.84 CF | 26.41 CF | 27.36 CF | 26.97 CF | 26.86 CF | 25.54 CF | 27.95 CF |
| Magnesium alloy | 15.73 CF | 19.02 CF | 20.16 CF | | | | 14.83 1SF,2AF | 16.04 1SF,2AF | 15.54 2SF,1AF |
| Titanium | 33.56 CF | 34.28 CF | 35.16 CF | 26.60 AF | 25.41 AF | 30.25 CF | 27.90 AF | 28.03 AF | 33.41 CF |

A simple indication of the adhesive performance or bondability of the substrate can be obtained by observing the mode of failure of a lap shear joint. The following failure modes observed can indicate:

AF—The indication of a poor interfacial adhesion between substrate and adhesive.

CF—The interfacial adhesion is good and therefore the failure is within the adhesive.

From Table 1, it is clear that the samples that have had no primer or laser pre-treatment display adhesion failure (AF) throughout. It can be deduced that the interface between the substrate and adhesive is not optimal for good adhesion and consequently the bond shows poor performance under accelerated ageing conditions, regardless of initial strength.

Tables 2 to 4 show that the failure mode of the aluminium and stainless steel joints is CF which indicates that the adhesion to the substrate has improved following primer and laser treatment. Titanium shows an improvement in failure mode for the initial samples to CF for all three metal conditions. It also shows improved failure mode to CF for both accelerated ageing tests when a high energy density setting is used.

Magnesium alloy, because of its own poor environmental resistance, is not suited to the kataplasma test. The failure modes of the initial samples are improved to CF but there is some substrate failure (SF) after salt spray testing. The predominant failure mode for magnesium alloy, following environmental ageing, is AF. The strength of the primer and laser treated magnesium, after saltspray, has significantly improved compared to those without primer and laser pre-treatment.

The above would indicate that the primer and laser pre-treatment imparts some improvement in failure mode from AF to CF, at least initially for all the metals tested. There are also improvements to the failure modes of aluminium, stainless steel and titanium after environmental ageing.

EXAMPLE 2

A stainless steel sheet is degreased by wiping with acetone. The degreased sheet is primed with a solution containing 81.5 parts by weight ethanol, 2.8 parts by weight galcial acetic acid, 9.4 parts by weight deionised water and 6.3 parts by weight gamma-glycidoxypropyltrimethoxy silane. The sheet is then exposed to a Q-switched Nd:YAG laser.

Two pieces of the treated sheet are bonded using a two-part cold curing epoxy resin adhesive. The resin component is a filled paste based on bisphenol A epoxy resin. The hardener component is a filled paste based on a mixture of aliphatic amine curing agents together with an amine-terminated butadiene acrylonitrile polymer. The resulting joint has a lap shear strength of 17.3 MPa with CF failure mode. The reference samples with no primer and laser pretreatment failed at 16.3 MPa with AF failure mode.

EXAMPLE 3

Example 2 is repeated using, instead of the laser used in Example 1, a $CO_2$ laser. The lap shear strength of the resulting joint is 17.9 MPa.

EXAMPLE 4

An oily aluminium alloy (L165) is subjected to various combinations of pretreatments which are (P) priming with a solution containing 81.5 parts by weight ethanol, 2.8 parts by weight glacial acetic acid, 9.4 parts by weight deionised water and 6.3 parts by weight gamma-glycidoxypropyltrimethoxy silane.

(L) Exposure to an Excimer Laser.

Two pieces of the treated aluminium alloy are bonded using a 1-component epoxy resin. This is a filled paste based on bisphenol A epoxy resin and containing a reaction product of bisphenol F epoxy resin and carboxy terminated butadiene acrylonitrile polymer. The curing agent comprises dicyandiamide and a particulate accelerator.

The results obtained are as follows:

| Treatment | Mean Strength | Failure Mode | After 14 days kataplasma Mean Strength (MPa) | Failure Mode |
|---|---|---|---|---|
| PL | 32.3 | CF | 28 | CF |
| LP | 28.4 | AF | 24.8 | CF |
| LPL | 37.3 | CF | 31.3 | CF |
| None | | | 25.9 | 50% AF |

What is claimed is:

1. A process for improving the adhesion properties of a metallic surface, comprising the steps of:
   (a) providing a metallic surface other than a clean aluminum or clean aluminum alloy surface;
   (b) applying a composition comprising an organosilane to the metallic surface and
   (c) exposing the surface to a laser.

2. The process of claim 1, wherein said metallic surface includes a member selected from the group consisting of steel, iron in ferrite form, titanium, magnesium, copper, gold, nickel, and chromium.

3. The process of claim 1, wherein said organosilane is first applied to said metallic surface and said metallic surface then is exposed to said laser.

4. The process of claim 1, wherein said metallic surface first is exposed to said laser and then said organosilane is applied to said metallic surface.

5. The process of claim 1, wherein said organosilane has the general formula $$R_nSi(OR^1)_m$$

wherein R is a reactive or non-reactive organic group, $R^1$ is alkyl, alkoxylalkyl, or acyl, n is 1 or 2 and m is 2 or 3 such that n+m=4.

6. The process of claim 5, wherein said organosilane is a member selected from the group consisting of $$CH_2=C(CH_3)COO(CH_2)_3Si(OCH_3$$

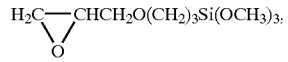

$CH_3Si(OCH_3)_3$
$C_6H_5Si(OCH_3)_3$
$CH_3(CH_2)_2Si(OCH_3)_3$
$HS(CH_2)_3Si(OCH_3)_3$
$CH_2=CHSi(OOCCH_3)_3$
$CH_2=CHSi(OCH_2CH_3)_3$
$CH_2=CHSi(OCH_3)_3$
$Cl(CH_2)_3Si(OCH_3)_3$ and
$CH_2=CHSi(OCH_2CH_2OCH_3)_3$.

7. The process of claim 5, wherein said organosilane is a member selected from the group consisting of

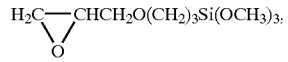

$CH_3Si(OCH_3)_3$
$C_6H_5Si(OCH_3)_3$
$CH_3(CH_2)_2Si(OCH_3)_3$
$HS(CH_2)_3Si(OCH_3)_3$ and
$Cl(CH_2)_3Si(OCH_3)_3$.

8. The process of claim 1, in which the organosilane is present in a solution at a concentration between 1 and 10% by weight.

9. The process of claim 1, wherein said surface is oily and/or aged.

10. A process as claimed in claim 1 in which the metallic surface is of iron in ferite form.

11. A process as claimed in claim 1 in which the metallic surface is of titanium or an alloy thereof.

12. A process as claimed in claim 1 in which the metallic surface is of magnesium or an alloy thereof.

13. A process as claimed in claim 1 in which the metallic surface is of copper or an alloy thereof.

14. A process as claimed in claim 1 in which the metallic surface is of gold or an alloy thereof.

15. A process as claimed in claim 1 in which the metallic surface is of nickel or an alloy thereof.

16. A process as claimed in claim 1 in which the metallic surface is of chromium or an alloy thereof.

17. A method of bonding a metallic surface to another surface which comprises treating the metallic surface by a process as claimed in claim 1 and then bonding the treated metallic surface to said another surface with an adhesive.

18. A method as claimed in claim 17, in which said another surface is a metallic surface other than a clean aluminum or aluminum alloy surface and is a surface treated by a process which comprises treating said another surface with an organosilane and exposing the treated another surface to a laser.

19. A method for improving the adhesion properties of a metallic surface which comprises treating the metallic surface by a process as claimed in claim 1 and then applying a coating to the treated surface.

20. A process for treating a metallic surface, other than a clean aluminum or clean aluminum alloy surface, which comprises treating the surface with an organosilane and exposing the surface to a laser at a strength and duration effective to produce a treated metallic surface that upon formation of an adhesive joint exhibits an increase in shear strength of said adhesive joint of at least 14%, compared to an untreated metallic surface, as measured using ISO 4587 with a test speed of 10 mm/min and expressed in units of MPa.

21. A process for treating a metallic surface, other than a clean aluminum or clean aluminum alloy surface, which comprises treating the surface with an organosilane and exposing the surface to a laser at a strength and duration effective to produce a treated metallic surface that upon formation of an adhesive joint exhibits an increase in shear strength of said adhesive joint of at least 14%, compared to an untreated metallic surface, as determined by first subjecting the adhesive joint to a Kataplasma Test and then measuring said shear strength using ISO 4587 with a test speed of 10 mm/min and expressed in units of MPa.

22. A process for treating a stainless steel surface, which comprises treating the surface with an organosilane and exposing the surface to a laser at a strength and duration effective to induce a change in failure mode from adhesion failure to cohesion failure, compared to an untreated stainless steel surface, as determined according to ISO 4587 with a test speed of 10 mm/min.

* * * * *